United States Patent [19]

Meyer

[11] Patent Number: 4,764,938
[45] Date of Patent: Aug. 16, 1988

[54] CIRCUIT AND METHOD FOR CORRECTING DISTORTION IN A DIGITAL AUDIO SYSTEM

[75] Inventor: John D. Meyer, Albany, Calif.

[73] Assignee: Meyer Sound Laboratories, Inc., Berkeley, Calif.

[21] Appl. No.: 436,195

[22] Filed: Oct. 25, 1982

[51] Int. Cl.$^4$ ............................................. H03H 7/30
[52] U.S. Cl. ........................................ 375/14; 333/18; 333/28 R; 381/103
[58] Field of Search .............................. 375/11, 12, 14; 328/167; 333/28 R, 18; 330/107, 109; 381/103

[56] References Cited

U.S. PATENT DOCUMENTS

| | | | |
|---|---|---|---|
| 3,446,996 | 5/1969 | Toffler | 333/28 R |
| 3,506,856 | 4/1970 | Toffler et al. | 333/28 R |
| 3,715,679 | 2/1973 | Fleischer | 333/28 R |
| 3,733,565 | 5/1973 | Pierret | 333/28 R |
| 3,736,517 | 5/1973 | Lim | 333/28 R |
| 4,140,983 | 2/1979 | Tamori et al. | 333/28 R |
| 4,272,738 | 6/1981 | Turner | 333/28 R |
| 4,361,892 | 11/1982 | Martin | 375/14 |

*Primary Examiner*—Benedict V. Safourek
*Assistant Examiner*—Stephen Chin
*Attorney, Agent, or Firm*—Donald L. Beeson

[57] ABSTRACT

A circuit and method are provided to compensate for the non-linear delay characteristics of a digital audio system introduced by the systems anti-aliasing filter. The circuit and method provide for introducing time delay to the digital system at the low and mid range frequencies, and adding decreasing amounts of time delay at the high frequency ranges to produce an overall composite time delay for the digital system which is relatively constant over its operating frequency range. The delay equalizer used to achieve such delay compensation is made up of active delay equalizer sections which are non-interactive, and which are independently tunable in terms of each sections center frequency and Q. An active delay equalizer section with a second order bandpass transfer functions has been devised to achieve this capability. It is comprised of an operational amplifier having input resistance and feedback resistance connected to its inverting input and a twin-T network connected in its non-inverting input. The twin-T is a driven twin-T for variable Q, and provides a delay equalizer wherein the time delay of each section can readily be tailored to the designers requirements.

21 Claims, 4 Drawing Sheets

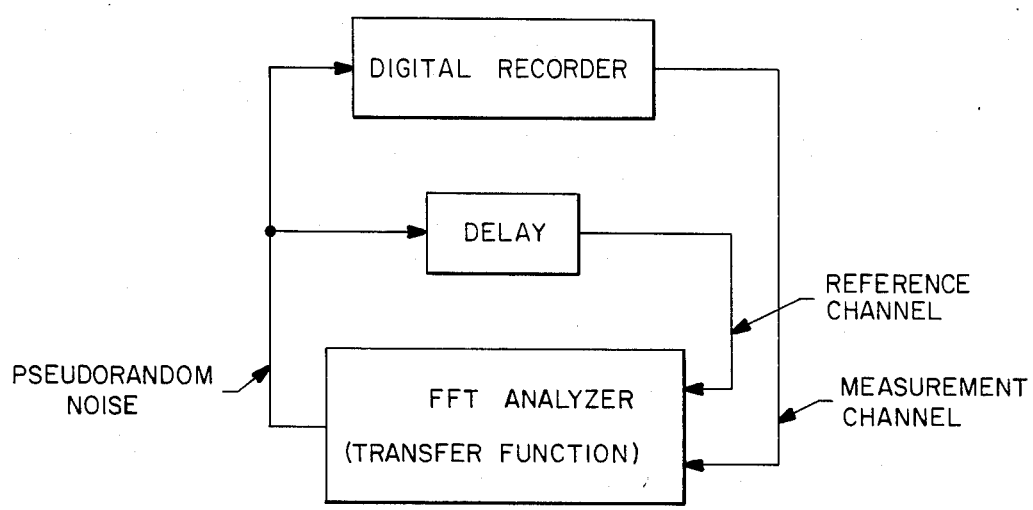
FIG.—1
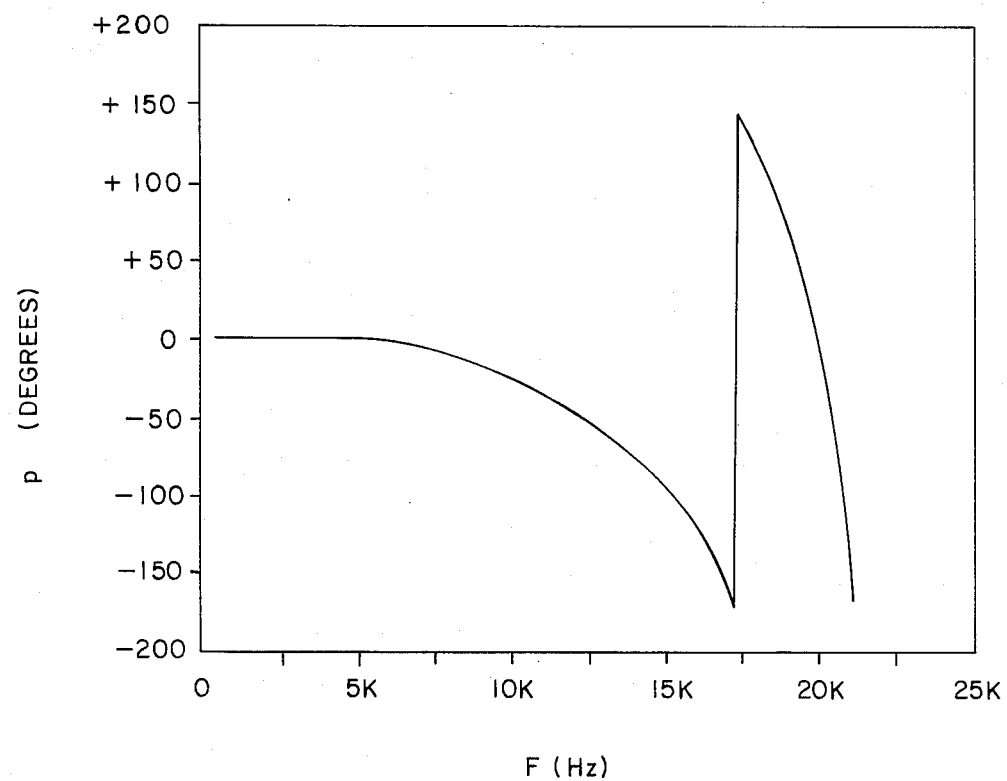
FIG.— 2

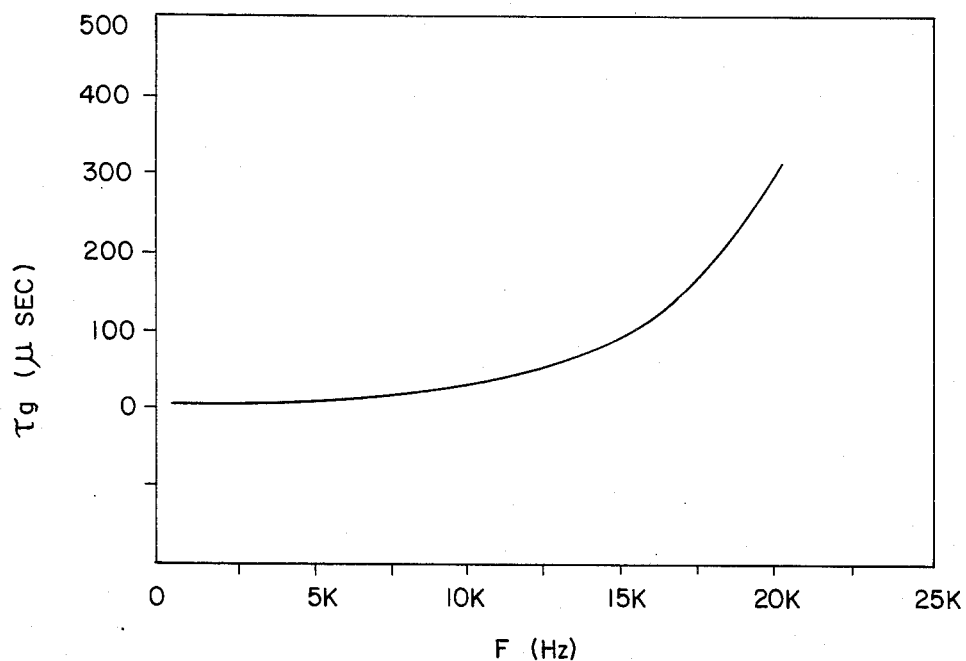
FIG.—3
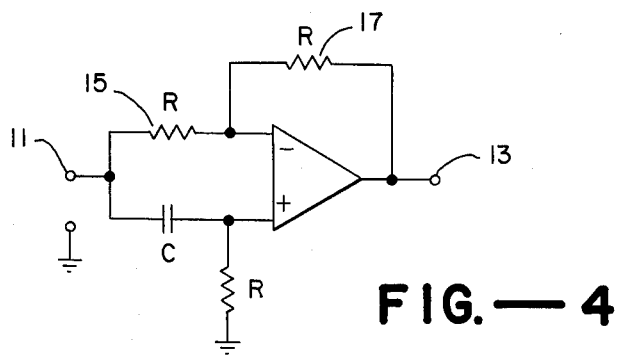
FIG.—4
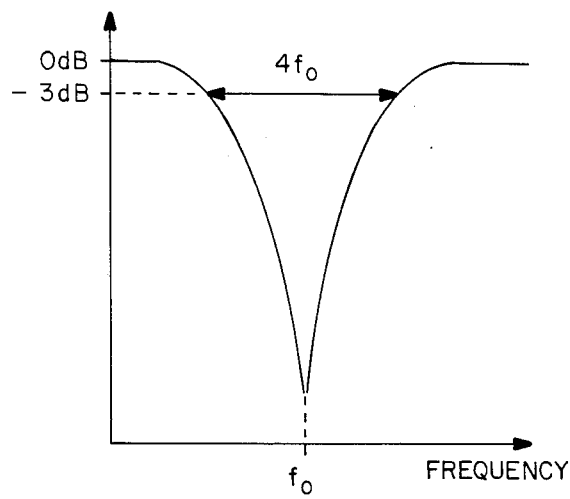
FIG.—5A
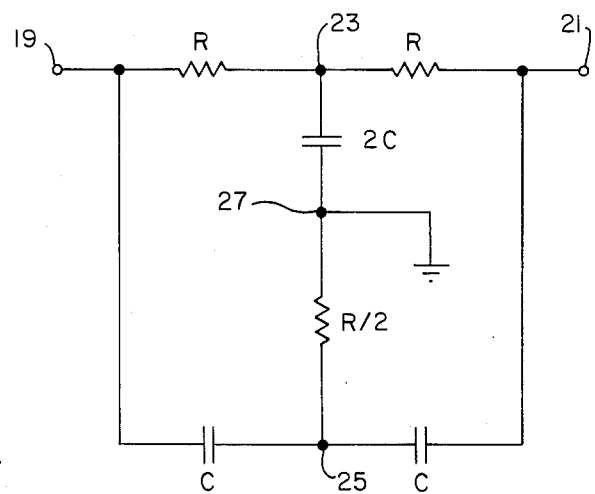
FIG.—5

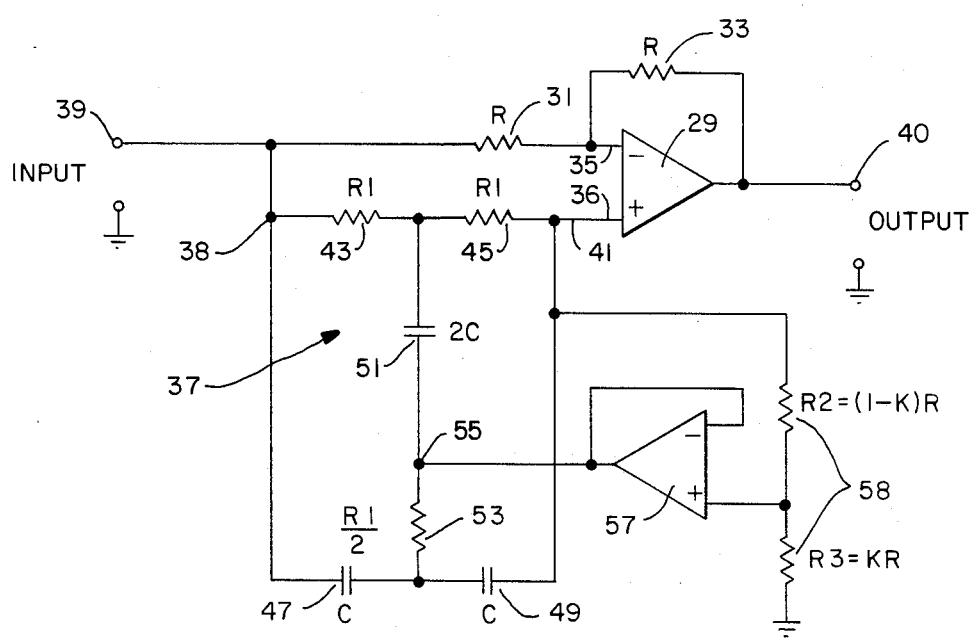
FIG.—6
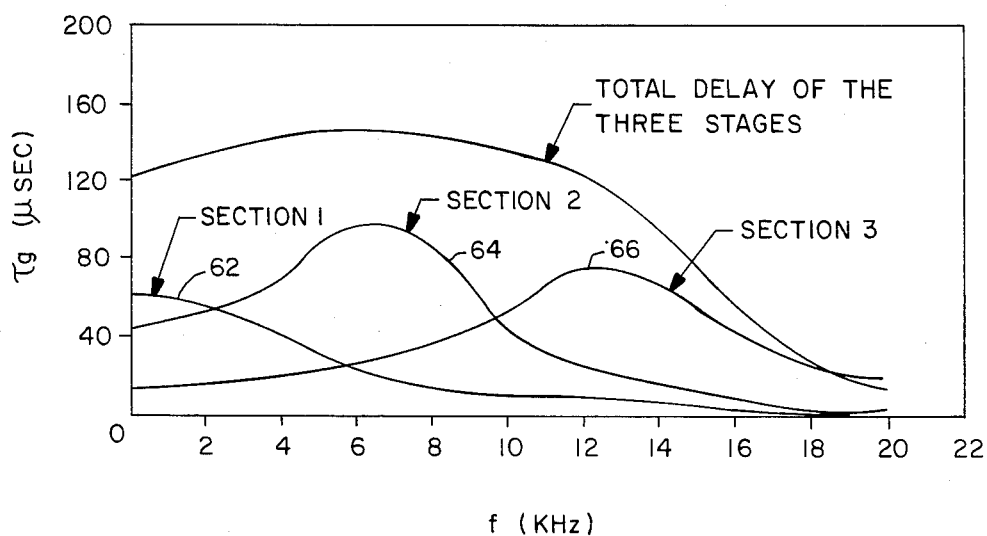
FIG.—8

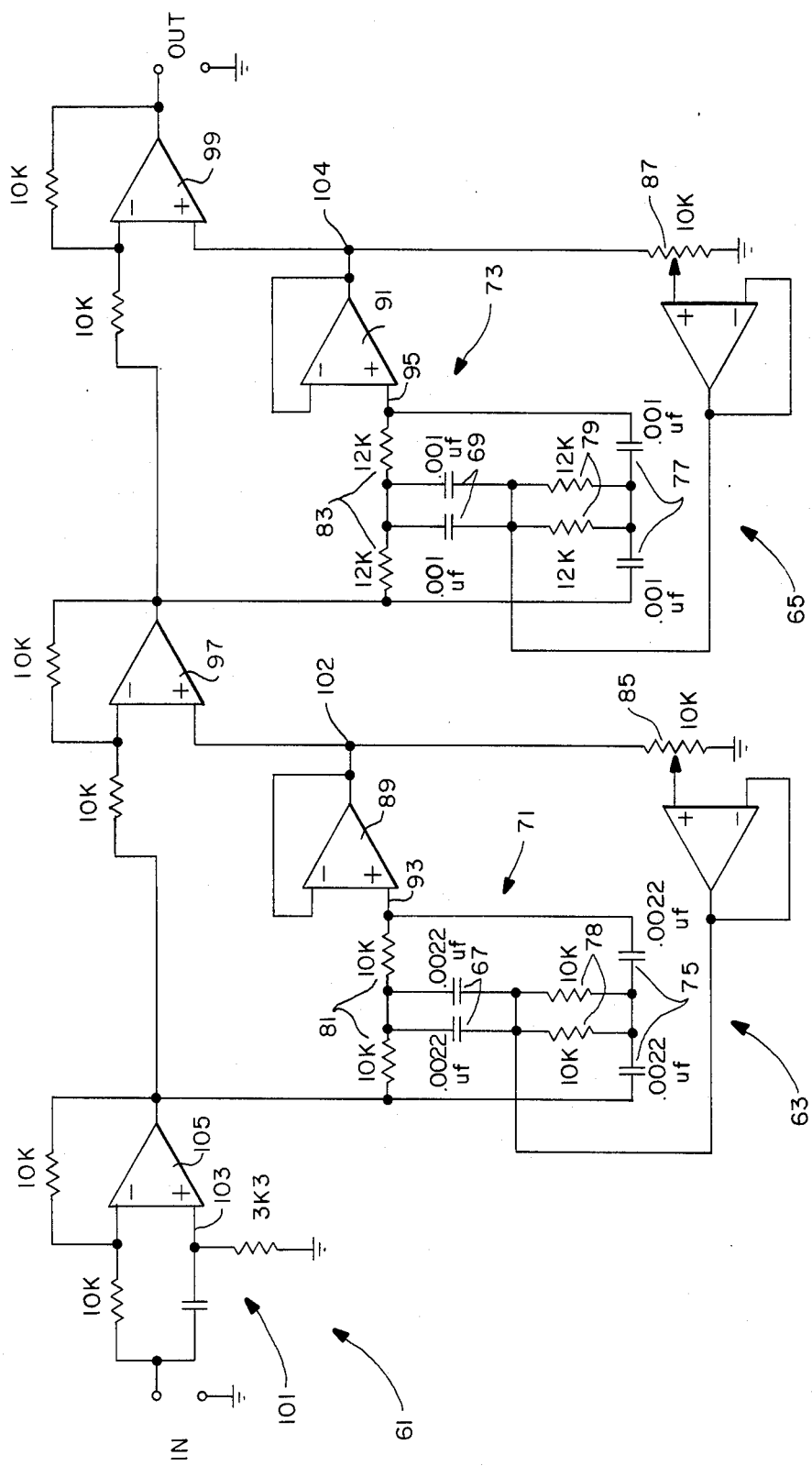
FIG.—7

CIRCUIT AND METHOD FOR CORRECTING DISTORTION IN A DIGITAL AUDIO SYSTEM

BACKGROUND OF THE INVENTION

The present invention relates generally to delay equalizers, also called all-pass filters, which are a class of networks exhibiting a flat frequency response but introducing prescribed phase shift versus frequency. The invention more particularly relates to delay equalizer sections which can be the building blocks of a larger delay network. The delay sections of interest generally have second order all-pass transfer functions, are tunable, and have particular application in compensating for discovered phase anomalies in digital audio systems, such as digital tape recorders. The invention also relates to the correction of the discovered phase anomalies in digital audio systems.

Digital audio systems generally require very steep filtering at about 20 KHz to prevent a phenomenon known as "aliasing" of the systems audio signal with the system's sampling frequency, now standardized at 44 KHz. To achieve steep attenuation near 20 KHz multipole filters have been devised known as anti-aliasing filters. Conventionally, such filters contain 13 to 24 poles and are difficult to build. While successfully achieving a satisfactory amplitude roll-off, it has been discovered that the anti-aliasing filter introduces phase distortion to the system and that such distortion detrimentally affects the system's audio performance.

To analyze the phase or time delay distortion in an audio system it is necessary to characterize the phase response of the system. In addition to pure phase shift, two different parameters are commonly used to define system phase response: One is phase delay ($t_p$) and the other is group delay ($t_g$). Phase delay and group delay are given by the formulas:

$$t_p = -p/2\pi f$$

$$t_g = (-1/2\pi) + (dp/df)$$

where p is the phase relationship between input and output signal and f is the frequency.

Conceptually, group delay represents the time that each frequency is delayed compared to other frequencies passed through the system. Stated differently, group delay will define how well an impulse (or any burst of frequencies) will be preserved as it passes through the system. Passing an impulse through a system which has constant (i.e. linear) group delay will not alter the pulse. Thus, any pure time delay (i.e. constant or linear time delay) however large will not alter the shape of the impulse, it will only delay it in time; non-linear group delay on the other hand will cause pulse degradation.

In this specification the term "time delay" will be used interchangeably with "group delay" since as used herein both are analogous. It will be understood, however, that there are conditions and circumstances where this analogy cannot be easily made, but such exceptions are not important to this disclosure. Because "time delay" is the more commonly used term in the audio industry and because when linear, time delay can be measured (group delay is calculated from phase response) "time delay" will normally be referred to.

Referring now to our digital system, the system will exhibit a total time delay which is the product of two introduced phase components: a linear, pure time delay, and a non-linear, frequency dependent time delay. The pure delay component results primarily from the data conversion process and time base correction for the recording medium; the system anti-aliasing filter and output smoothing filter also contribute a small amount of pure delay. However, the non-linear delay component which is believed to detrimentally affect the audio response of the digital system is contributed primarily by the anti-aliasing filter. (The output smoothing filter of the digital system also contributes a small amount of non-linear delay.) Non-linear delay can be measured in a digital system by subtracting the linear delay components. This is done by comparing the output of the digital system with a reference signal consisting of the original signal suitably delayed by a high quality delay line to reproduce the linear delay component of the digital system. A test apparatus for achieving this measurement is shown in FIG. 1. Using an FFT Analyzer a digital recorder phase response was measured and is shown in FIG. 2 of the drawings. From this phase response the group delay characteristic of the digital recorder was calculated from the above formulas and this characteristic is shown in FIG. 3.

With this discovered phenomenon in digital systems the problem is how to overcome the resultant degradation of the audio output. It has been discovered that improved performance can be achieved by adding time delay to the overall digital system at the lower and mid range frequencies such that the time delay of the digital system over its operating frequency range, near DC to 20 KHz, will be relatively frequency independent. Thus, the invention in one aspect involves means for delay equalization which adds delay from near DC to where the group delay curve of a digital system begins to increase with frequency (See FIG. 3), and then, where the group delay of the system is increasing, adding decreasing amounts of time delay to provide a composite relatively flat delay curve versus frequency.

The difficulty of implementing such a delay equalization is that a suitable delay equalization network would require numerous poles and would have to be precisely tuned to achieve a desired equalization. While theoretically such a circuit could be devised, in practice it would be quite difficult, since conventional delay equalizers do not have the capability of being easily tuned and require high precision parts. In the present invention, an active delay equalizer section has been devised which is easily tunable, which has separately tunable circuit parameters, and which can be readily and non-interactively cascaded with other sections. A multipole delay equalizer is provided which can be constructed with relatively low tolerance parts and which can be readily trimmed for a desired delay characteristic.

SUMMARY OF THE INVENTION

The invention in its broadest terms comprises circuit means for correcting the detrimental effects of non-linear delay introduced by the anti-aliasing filter of a digital system and a method for correcting such delay. The circuit means and method include essentially means for adding total time delay to the digital system at the low and mid-band operating ranges of the system and increasingly less time delay at the high end of the frequency range until at about 20 KHz practically no delay is added, so as to provide a composite overall system time delay which is relatively constant over the entire frequency range.

A further aspect of the invention has a delay equalizer section and a delay equalizer network built up from said sections which can provide time delay equalization required to equalize the high end, anti-aliasing filter caused, phase distortion of a digital system. The delay equalizer section of the invention is an active delay circuit comprised of an operational amplifier having the all-pass circuit topology and a second order transfer function provided by a twin-T circuit for creating a band pass delay characteristic for the all-pass section. In the preferred circuit topolgy the signal input is fed to both the inverting and non-inverting inputs of the operational amplifier through an input resistance in the case of the inverting input, and through the twin-T circuit in the case of the non-inverting input. The output of the operational amplifier is fed back to the inverting input through a feed back resistance, the value of which in relation to the input resistance connected to the inverting input will establish the gain structure of the amplifier. In the preferred embodiment the twin-T is a driven twin-T such that the Q of the twin-T circuit and hence the shape of the time delay curve versus frequency at the signal output of the equalizer section can be varied.

It will be seen that by using a general twin-T network, a network with matching RC values, a desired delay equalizer response can easily be achieved with relatively low tolerance parts using conventional part selection techniques: by "binning" parts matching parts can be chosen where the part values match within close tolerances but the rated values of parts have relatively low tolerances. Trimming of the circuit bandpass center frequency is easily achieved by paralleling additional circuit elements across the existing twin-T circuit elements. In addition, it will be seen that Q adjustments are readily made by providing a twin-T drive circuit comprised of a potentiometer which can be user adjustable.

In a further aspect of the invention the above described delay sections are employed in a delay equalizer network comprised of two double pole equalizer sections and an input section comprised of a single pole delay line which introduces low frequencies delay. Such a delay equalizer network will introduce relatively constant time delay versus frequency over the low and midband frequency ranges of an audio system and diminishing time delay at the high end, and will have easily tunable non-interactive sections to achieve the composite group delay characteristic required.

Therefore, it can be seen that the primary objective of the present invention is to provide a active delay equalizer section which has independently tunable circuit parameters, and which can be cascaded into a multiple of sections which are non-interactive and which can be made to easily yield a desired composite time delay characteristic. It is a further object of the invention to provide a practical means for substantially eliminating the adverse audio effects caused by frequency dependent group delay introduced in the high frequency ranges of a digital audio system by the system's anti-aliasing filter. Such equalization can practically be achieved through the improved circuit topology of the aforementioned delay equalizer section.

DESCRIPTION OF THE DRAWINGS

FIG. 1 is a block diagram of a measurement system for measuring phase delay in a digital audio system.

FIG. 2 is a graph showing the phase response versus frequency of a digital tape recorder as measured by the measurement system of FIG. 1.

FIG. 3 is a graph showing the calculated group delay versus frequency for the digital tape recorder whose phase response is depicted in FIG. 2.

FIG. 4 is a circuit diagram of a single pole active delay equalizer section which is known in the art.

FIG. 5 is a schematic drawing of a conventional twin-T circuit, otherwise known as a notch filter, used for amplitude correction.

FIG. 5A is graph showing the amplitude versus frequency characteristics of a twin-T circuit.

FIG. 6 is a schematic view of an active delay equalizer section in accordance with the invention, having a twin-T circuit which is driven to provide variable Q.

FIG. 7 is a three stage active delay equalizer, the second and third stages of which are comprised of the delay equalizer section shown in its general form in FIG. 6.

FIG. 8 is a graph showing group delay in microseconds versus frequency for each of the three circuit sections of the FIG. 7 circuit, and also showing a composite group delay curve for the three sections.

DETAILED DESCRIPTION OF THE PREFERRED EMBODIMENT

With reference to FIGS. 4 through 6 of the drawings, the invention involves a discovery that an active all-pass circuit, such as shown in FIG. 4, can be used in conjunction with a conventional twin-T circuit, such as shown in FIG. 5, to provide a tunable second order active delay circuit having a relatively simple circuit topology, as illustrated in FIG. 6; the FIG. 6 circuit is characterized by a flat frequency response and a prescribed second order bandpass delay characteristic. It is recognized that the all-pass circuit of FIG. 4 is a conventional all-pass delay section wherein the phase of the output signal at output 13 lags the input signal at input 11, with the phase shift at $-90°$ occurring at $w=1/RC$; group delay is maximum near DC where group delay equals 2RC. The gain structure of the all-pass network shown in FIG. 4 is determined by the relative values of the input and feedback resistances 15, 17; typically these resistances will be equal to provide for unity gain.

In connection with the FIG. 4 circuit and the circuits shown in FIGS. 5 and 6, it is understood that the operational amplifiers shown in these circuits will be provided with suitable power supplies in accordance with manufacturers recommendations.

Referring to the twin-T circuit shown in FIG. 5, such a circuit is also known as a "notch filter" because the circuit has the characteristic of providing large attenuation over a narrow band of frequencies and passing all other frequencies. The general amplitude versus frequency characteristic of a twin-T is shown in FIG. 5A. As seen in FIG. 5 the twin-T network, with an input 19 and output 21, is a passive RC circuit having two matched series resistances, R, and two matched series capacitances, C, connected between the input and the output, together with a shunt capacitance and resistance connected in series between the junction 23 of the two matched resistances and the junction 25 of the two matched capacitances. In this twin-T configuration, the shunt capacitance is connected from the junction 23 and has a value equal to twice the capacitance of one of the matched, series connected capacitances, and the shunt resistance is connected to the junction 25 of the matched capacitances and has a value equal to one half the resistance of one of the matched pair of series connected resistances. The node 27 between the shunt capacitance and the shunt resistance of the twin-T is normally grounded. Assuming that the twin-T input 19 is driven from a low impedance voltage source and that the output 21 is terminated by an infinite load, the Q of the twin-T network will be ¼ at its center frequency, with the center frequency being determined by the relationship $$f_0 = 1/2\pi RC$$

Using the above discussed known networks, namely, the all-pass delay filter and the twin-T network, it has been discovered that an active delay equalizer section can be created which has a desired second order bandpass phase response which does not suffer the limitations of conventional second order all-pass or delay equalizer networks in terms of the difficulty of building multi-stage delay equalization networks: the second order circuit has a minimum number of parts and requires no inductances, and is easily tuned as will be described below.

Referring to FIG. 6 there is shown an active delay equalizer section in accordance with the invention which includes, a first operational amplifier 29 having an input resistance and feedback resistance 31, 33 connected to the inverting input 35 of the operational amplifier, and a twin-T network, generally denoted by the numeral 37, having a twin-T input 38 and a twin-T output 41 connected, respectively, from the signal input 39 to the non-inverting input 36 of the operational amplifier 29. Because of the normally very high input impedance of an operational amplifier, the twin-T network 37 will see, in practical terms, an infinite load; the twin-T is driven from a low impedance voltage source when driving the input 39 from the output of an operational amplifier. The relative circuit element valves of the twin-T are the same as the notch filter of FIG. 2: the series connected resistances 43, 45 are matched as are the series connected capacitances 47, 49, and the shunt capacitance and resistance 51, 53 have values equal, respectively, to twice and one-half the value of the corresponding series connected circuit elements. The center frequency of this circuit can be determined by the above frequency equation for a twin-T circuit.

As previously mentioned, the Q of the twin-T in FIG. 3 will be ¼ if the R-C node 55 between the shunt capacitance 51 and shunt resistance 53 is grounded. However, this Q can be adjusted by driving the R-C node from a divider network comprised of a low impedance voltage source 57 and voltage divider 58 which scales the available voltage at the output of the twin-T network by a constant K between zero and one. Using this scaled voltage to drive the R-C node 55, the Q of the twin-T notch circuit will be determined by the relationship:

$$Q = \frac{1}{4(1-K)}$$

Voltage divider 58 will preferably be implemented by a potentiometer which in the configuration shown in FIG. 3 should have a large resistance value in relation to the twin-T resistances to prevent loading of the twin-T.

With further reference to FIG. 6, it has been mentioned that the amplitude versus frequency response of the delay equalizer section as measured at the signal output 40 will be relatively flat, in accordance with its all-pass characteristic. However, the time delay characteristics of the section as measured at the output 40 will vary with frequency depending on the Q and center frequency of the twin-T network connected to the non-inverting input of the operational amplifier 29. Specifically, the time delay will exhibit a second order, bandpass characteristic, in that, it will vary from a relatively low value to a maximum time delay at approximately the center frequency of the twin-T and decrease again to a relatively low value. The maximum time delay and the time delay near DC can be determined by the following relationships.

$$tg(max) = 2Q/f_0 \quad tg(DC) = 1/Qf_0$$

If we assume the total voltage divider resistance R2+R3 is substantially greater than the resistance values R1 in the twin-T network, then the calculated group delay of the network at the signal output 40 can be expressed as a function of frequency as follows:

$$tg(f) = \frac{2Q\, w_o(w^2 + w_o^2)}{Q^2(w^2 - w_o^2)^2 + w^2 w_o^2}$$

where $w_o = 2f_0$ and $w = 2f$.

The pure phase response of this circuit at the signal output 40, as distinguished from the time delay, can be expressed by the following equation $$B(w) = -2\tan^{-1}\frac{w\, w_o}{w_o^2 - w^2}$$

From the above equations it can be seen that two of the variables, Q and $w_0$ (and hence tg), can be independently manipulated in the circuit in a way that will permit the time delay versus frequency response curve to be designed and built to a desired characteristic. First, the center frequency fo can be established by changing the values of either the resistances or the capacitances, or both, in the twin-T network: The center frequency $f_0$ can be set by proper selection of the RC components 43, 45, 47, 49, 51, 53, and then this center frequency can be readily and very practically trimmed by adding parallel resistances or parallel capacitances or both to the existing circuit elements. Adding parallel resistance values to the twin-T resistances will decrease the individual resistance values and thereby increase $f_0$, while adding parallel capacitances to the twin-T capacitance elements will cause the capacitance values to increase, thereby decreasing $f_0$. Part selection from the same lot of matched parts will permit relatively low tolerance and inexpensive RC parts to be used.

Secondly, the Q characteristic of the second order time delay versus frequency curve can be further adjusted by adjusting the Q by adjusting the potentiometer used for implementing the voltage divider 58. Adjustment of Q, which will affect the bandwidth of the time delay curve, will not affect the center frequency, and conversely adjustment of the center frequency is made without affecting the Q adjustment. Assuming an input signal at the signal input 39 from a relatively low source impedance and assuming a relatively high impedance load at the signal output 40, these $f_0$ and Q adjustments to the delay equalizer section can be made independently of one another without being affected by upstream or down-stream sections or loads.

Cascading of delay equalizer sections is shown in FIG. 6, which shows a tunable multi-stage delay equalizer which can be used to compensate for the discovered time delay introduced by anti-aliasing filters used in digital audio systems. Because of the steep roll off characteristic demanded of anti-aliasing filters, the high frequency time delay roll up is significant and, it is discovered, perceptibly effects the audibility of the sound produced by the system. The time delay characteristic versus frequency of a digital system due to non-linear effects primarily contributed by the anti-aliasing filter is shown in FIG. 3. The detrimental effects of the frequency dependent delay characteristic shown in FIG. 3 for high frequencies can, it has been found, substantially be reduced using the active delay equalizer shown in FIG. 4 wherein three circuit sections 61, 63, 65, each having time delay versus frequency curves 62, 64, 66 distributed over the frequency spectrum as shown in FIG. 8, produce a composite total time delay curve for the three sections as shown by the composite curve 67. It is observed that the composite time delay curve of the FIG. 7 circuit introduces a total delay of approximately 150 microseconds at frequencies of up to approximately 12 KHz whereupon the composite curve rapidly rolls off. By adding substantially constant time delay at the lower frequency spectrum and by adding a rapidly decreasing amount of time delay at the high end of the frequency spectrum, it can be seen that the composite time delay of the digital system (FIG. 3) and time delay of the three section delay equalizer will be relatively constant. It is further observed that while some overall time delay (up to 150 microseconds) has been added to the digital system, such delay will be relatively insignificant compared to the overall processing time of approximately 11 milliseconds, which is typical of a digital tape recorder. By adding small amounts of overall delay the advantage is achieved that the frequency dependent nature of the time delay will be largely eliminated and the audio performance of the digital system thereby improved.

In reference to the desired relative constancy of the composite time delay, it is found that composite time delay versus frequency of the corrected digital systems should be within approximately ±10 microseconds to achieve noticeably improved performance.

The RC values shown in FIG. 7 are the RC values used for achieving the group delay versus frequency curves of FIG. 8. It is noted that a minimum of different part values are required. The shunt capacitances 67, 69 of the twin-T's 71, 73 are made to equal twice the series capacitances 75, 77 by simply paralleling two like value capacitors; likewise, the twin-T shunt resistances 78, 79 are made to equal one half the series resistances values 81, 83 by paralleling two like value resistances.

It was previously noted that the potentiometer 85, 87 for driving the twin-T to increase the twin-T Q should normally be of a relatively high value to prevent loading of the twin-T circuit. However, it would be desirable to use a low resistance potentiometer for ease in part selection and to reduce noise. To permit a low value potentiometer to be used, buffering voltage followers 89, 91 are inserted between the twin-T outputs 93, 95 and the junctions 102, 104 of the potentiometers 85, 87 and op amp inverting inputs. The voltage followers will provide the necessary high impedance load to the output of the twin-T circuits while providing a low impedance voltage source to the potentiometer and main operational amplifiers.

It should be noted that the first stage 61 of the FIG. 7 network, unlike the second and third stages 63, 65, is a simple single pole delay circuit with a high pass RC circuit 101 connected to the inverting input 103 of the sections operational amplifier 105. This single pole network is used because the maximum group delay of the group delay curve for the first section 61 is near DC.

It can readily be understood that the cascaded sections of FIG. 7 can, due to the tunable characteristics of the twin-T circuits of each section, readily be modified to meet the designers needs by a simple change in parts, and each section can be easily trimmed in terms of its Q and $f_0$. Thus, with this circuit topology the designer can build up a complex multi-stage delay network with non-interactive sections to readily achieve a desired delay characteristic. For example, group delay might be added at high frequencies only by eliminating the single pole section 61 in the FIG. 7 circuit and adding an additional double pole delay equalizer section tuned to approximately 16 to 18 KHz. With reference to the group delay curves of FIG. 8, this could increase the composite group delay curve at the high end and roll it off at the low end of the spectrum.

In fabricating the tunable delay equalizer sections of the invention good high gain op amps should be used since the twin-T filter produces very high amplitude attenuation of the signal to the non-inverting input of the op amp at the twin-T center frequency $f_0$, which will force a correspondingly large swing in voltage of opposite polarity at the inverting input. With the twin-T circuit topology shown in FIGS. 5, 6 and 7, where the shunt RC node is driven from the feedback potentiometer, Q's in the range of 0.25 to 100 can be achieved.

Therefore, it can be seen that the present invention involves active delay equalizer sections which are non-interactive and which have independently tunable center frequencies and Qs, and which can be fabricated from relatively low tolerance standard value electrical parts. It is an important feature of the invention that the sections can be cascaded and trimmed in terms of its circuit parameters to enable a designer to build up a desired composite group delay curve to achieve desired phase delay equalization in an all-pass circuit. It is particularly seen that the features and benefits of the invention have been achieved by a unique and novel use of the twin-T circuit, a circuit which has heretofore conventionally been employed as a notch filter.

Although the invention has been described in considerable detail in the foregoing specification, it is not intended that the invention be limited to such description, except as is necessitated by the following claims.

I claim:

1. A method for correcting phase distortion in a digital audio system comprised of the steps of adding time delay to the digital audio system at low and mid-band frequencies within the operating range of the system, and, at high frequency ranges, adding decreasing amounts of time delay such that total time delay for the system is increased but where said total time delay is relatively constant within the digital audio system's operating frequency range.

2. The method of claim 1 wherein the added time delay at the high frequency range is decreased such that essentially no time delay is added at approximately 20 KHz.

3. The method of claim 2 wherein the maximum time delay added at low and mid range frequencies is approximately 150 microseconds.

4. The active delay equalizer of claim 1 wherein time delay is added such that the total time delay of said system varies by no more than approximately ±10 microseconds over the operating frequency range of said system.

5. An active delay equalizer for correcting for high end phase distortion in a digital audio system, said active delay equalizer comprising
   a signal input and signal output,
   circuit means between said signal input and signal output for adding time delay to audio signals inputted to said signal input,
   said time delay being added by said circuit means substantially at the lower and middle portion of the audio system's operating frequency range such that the time delayed audio signal at said signal output combines with high end time delay introduced by said digital audio system to produce an overall system time delay which is relatively constant over the system's operating frequency range.

6. The active delay equalizer of claim 5 wherein the time delay introduced by said circuit means is relatively constant from near DC up to approximately 10 KHz to 14 KHz, where the time delay versus frequency curve of said circuit means begins to roll off.

7. The active delay equalizer of claim 6 wherein the maximum added time delay is approximately 150 microseconds up to frequencies around 12 KHz.

8. The active delay equalizer of claim 7 wherein said time delay characteristic rolls off to approximately 20 microseconds or less at 20 KHz.

9. The active delay equalizer of claim 5 wherein the circuit means of said delay equalizer adds time delay to the audio signal to achieve an overall corrected time delay for said digital audio system having approximate maximum variations of ±10 microseconds over the system's operating frequency range.

10. An active delay equalizer of claim 5 wherein said circuit means include a plurality of cascaded active delay equalizer sections, each of said delay equalizer sections contributing prescribed time delay at different portions of the audio system's operating frequency range so as to provide, over said operating frequency range, a composite time delay which combines with the time delay of said digital audio system to produce an overall system time delay which is relatively constant.

11. The active delay equalizer of claim 10 wherein the first of said plurality of equalizer sections is a single pole all pass section introducing time delay at low frequencies within said system operating frequency range to near DC.

12. The active delay equalizer of claim 10 wherein said delay equalizer sections include at least one second order all pass delay equalizer section.

13. The active delay equalizer of claim 12 wherein said second order all pass delay equalizer section is comprised of an operational amplifier having an all pass circuit topology, said all pass circuit topology including a twin-T notch circuit at the input of said operational amplifier and circuit means for driving the R-C node of said twin-T notch circuit with the scaled output voltage of said twin-T notch circuit whereby the scaling of said twin-T notch circuit output voltage determines the Q of said twin-T notch circuit output.

14. The active delay equalizer of claim 13 wherein the scaled output voltage of said twin-T notch circuit is applied to the R-C node of said twin-T circuit from a variable voltage divider and wherein circuit means having low output impedance and unity gain are provided to take the output of said voltage divider and drive the R-C node of said twin-T circuit such that the quality factor, Q, of the twin-T is variable as determined by the following relationship $$Q = \frac{1}{4(1-K)}$$

where K is the ratio of the voltage output of the voltage divider to the total available voltage at the twin-T circuit output.

15. The active delay equalizer section of claim 13 wherein the resonant frequency, fo, of said twin-T circuit is determined by the relationship $$f_o = 1/2\pi RC$$

where R and C are the values of the series resistances and series capacitances of the twin-T circuit, and wherein the resonant frequency is trimmed by paralleling additional capacitances and resistances with said twin-T capacitances and resistances to, respectively, decrease or increase the resonant frequency without affecting the quality factor, Q.

16. The active delay equalizer section of claim 14 further including buffer circuit means between the twin-T output and said voltage divider so as to drive said voltage divider from a low impedance source.

17. The active delay equalizer section of claim 16 wherein said buffer circuit means comprises a unity gain operational amplifier voltage follower having its inverting input connected to the non-inverting input of said first operational amplifier, its non-inverting input connected to the output of said twin-T and its output connected to said voltage divider.

18. An active delay equalizer for correcting for phase distortion in a digital audio system comprising
   cascaded active delay equalizer sections which provide, over the operating frequency range of said digital audio system, a composite time delay which combines with the time delay of said digital audio system to produce an overall system time delay which is relatively constant, said cascaded delay equalizer sections including
   a single pole all pass delay equalizer section providing time delay near DC and at the low end of said system operating frequency range,
   at least two second order all pass delay equalizer sections tuned above the roll off of said single pole all pass section to provide a composite time delay which rolls off at the high end of the system's operating frequency range.

19. The active delay equalizer of claim 18 wherein each of said second order all pass delay equalizer sections is comprised of an operational amplifier having an all pass circuit topology, said all pass circuit topology including a twin-T notch circuit at the input of said operational amplifier and circuit means for driving the R-C node of said twin-T notch circuit with the scaled output voltage of said twin-T notch circuit whereby the scaling of said twin-T notch circuit output voltage determines the Q of said twin-T notch circuit output.

20. The active delay equalizer of claim 19 wherein said second order sections are tuned to different frequencies above said single pole all pass section such that the composite time delay of said equalizer sections rolls off with the high frequency second order section.

21. The active delay equalizer of claim 20 wherein one of said second order all pass sections is tuned between approximately 6 and 7 KHz and the other of said second order all pass sections is tuned to between approximately 12 and 13 KHz.

* * * * *